United States Patent [19]

Offutt

[11] 3,802,091

[45] Apr. 9, 1974

[54] D.C. SHUTDOWN CIRCUITRY FOR I.C CONTROLLED DRYER

[75] Inventor: Carl R. Offutt, St. Joseph, Mich.

[73] Assignee: Whirlpool Corporation, Benton Harbor, Mich.

[22] Filed: May 7, 1973

[21] Appl. No.: 358,092

[52] U.S. Cl. ........................ 34/45, 307/296, 323/22, 34/55

[51] Int. Cl. ........................ F26b 19/00, H03k 17/60

[58] Field of Search ................ 34/43, 44, 45, 53, 55

[56] References Cited

UNITED STATES PATENTS

| | | | |
|---|---|---|---|
| 3,702,030 | 11/1972 | Janke | 34/45 |
| 3,235,786 | 2/1966 | Gaskill | 307/202 |
| 3,335,361 | 8/1967 | Natale et al. | 323/22 T |
| 3,582,713 | 6/1971 | Till | 323/20 |
| 3,732,442 | 5/1973 | Husbands et al. | 321/45 S |

FOREIGN PATENTS OR APPLICATIONS

| | | | |
|---|---|---|---|
| 1,800,188 | 2/1970 | Germany | 321/45 S |

*Primary Examiner*—William F. O'Dea
*Assistant Examiner*—Paul Devinsky
*Attorney, Agent, or Firm*—Hill, Sherman, Meroni, Gross & Simpson

[57] ABSTRACT

In an integrated circuit controlled clothes dryer which includes a circuit for producing a reset pulse to initialize a memory storing a program of drying functions, D.C. shutdown circuitry is interposed between the integrated circuit chip and the power supply for the integrated circuit to quickly remove D.C. voltage from the integrated circuit at selected times so that a positive generation of the reset pulse may be obtained upon the reapplication of power to the integrated circuit. The D.C. power supply includes a capacitive filter which is isolated from the circuit and when power is removed so that upon the occurrence of a rapid succession of reapplications of power a smooth, well filtered D.C. is always available to the integrated circuit.

9 Claims, 3 Drawing Figures

D.C. SHUTDOWN CIRCUITRY FOR I.C CONTROLLED DRYER

BACKGROUND OF THE INVENTION

1. Field of the Invention

This invention relates to D.C. powering techniques for integrated circuits, and is more particularly concerned with the provision of D.C. shutdown circuitry for an integrated circuit controlled clothes dryer.

2. Description of the Prior Art

An integrated circuit controlled clothes dryer is disclosed in U. S. Pat. No. 3,702,030, U.S. Pat. Ser. No. 129,008, issued Nov. 7, 1972, and assigned to Whirlpool Corporation. The integrated circuit includes, among other logic components, a memory which stores a program of drying operations. Part of the control of the memory includes circuitry for generating a memory reset pulse to initialize the memory at selected times, e.g. opening or closing of the dryer door, termination and restarting of the dryer, so that the memory is not conditioned to an arbitrary state, but is initialized to a predetermined logic state, and subsequently indexed as necessary. In developing the reset pulse, a capacitor is utilized to provide a delay in pulse generation. When power is removed from the integrated circuit, the capacitor must be completely discharged so that the pulse generation circuits can produce the reset pulse. It has been determined, however, that in practice a transistor of the integrated circuit ceases to conduct at a voltage which is sufficient to slow the discharge of the capacitor to an extent where reapplication of power to the integrated circuit does not, in certain instances, permit a positive generation of a reset pulse. For example, a rapid succession of opening and closing of the dryer door may not be followed by positive accurate corresponding generation of reset pulses.

In the power supply art in general, power supply circuits are known which utilize a series regulating transistor, in particular those having a separate power supply for the collector and base of the transistor. U. S. Pat. Nos. 3,235,786; 3,582,713; 3,335,361 and 3,090,905 all disclose power supply circuits having a series regulating transistor; however, none of these teach shutdown techniques.

SUMMARY OF THE INVENTION

The primary object of the present invention is to provide for a positive generation of a reset pulse for a memory of an integrated circuit controlled dryer under a variety of starting and stopping conditions.

Another object of the invention is to provide D.C. shutdown circuitry for an integrated circuit controlled dryer.

Another object of the invention is to provide quick removal of direct current voltage from a power supply from an integrated circuit while at the same time always providing a smooth well filtered D.C. voltage for reapplication to the integrated circuit.

According to the invention, a series emitter-follower voltage regulator including a transistor and a Zener diode is connected between a power supply filter capacitor and an integrated circuit. The power supply includes a transformer having a full wave bridge rectifier connected across a portion of a secondary winding. A filter capacitor is connected across the rectifier and between the collector of the voltage regulator transistor and ground. The power supply further includes a rectifier connected to the secondary winding of the transformer for feeding half wave rectified charging current to a small capacitor which is connected to ground and across a resistor voltage divider. A junction of the voltage divider is connected to the base of the regulator transistor and through a Zener diode to ground. The emitter of the regulator transistor is connected to the integrated circuit. The filter capacitor is sufficiently large so that a charge can be stored for very long periods of time to guarantee the availability of a smooth D.C. upon the reapplication of power, while the small capacitor is sufficiently small so that discharging thereof via the resistor voltage divider is rapid and quickly causes an insufficient current flow to the base of the transistor to maintain the transistor in conduction. The transistor is therefore quickly cut off and removes power from the integrated circuit. The low value of this small capacitor also provides for a rapid charging thereof so that reapplication of power effects a rapid and sufficient current delivery to the base of the regulator transistor to turn on the transistor and maintain the same conductive up to the next loss of power to the power supply.

BRIEF DESCRIPTION OF THE DRAWING

Other objects, features and advantages of the invention, its organization, construction and operation will be best understood from the following detailed description of an exemplary embodiment thereof taken in conjunction with the accompanying drawing, on which.

DESCRIPTION OF THE PREFERRED EMBODIMENT

Figure 1:
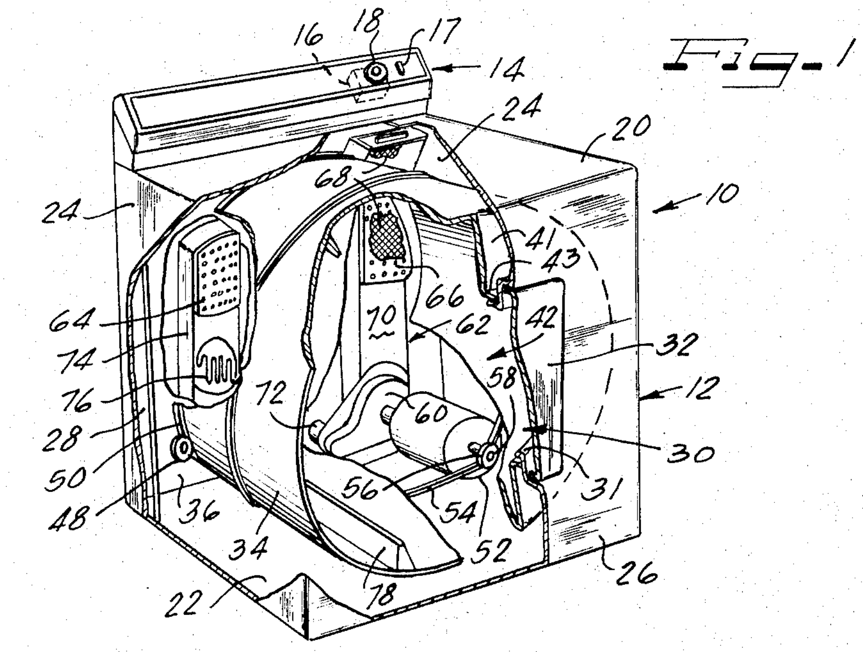
FIG. 1 pictorially illustrates a clothes dryer which may utilize the present invention, the dryer being shown in a partial fragmentary manner.

In the preferred embodiment of the invention, as illustrated in FIG. 1, a clothes drying appliance 10 is shown comprising an enclosure cabinet 12 with a control console 14 thereon, housing a control device 16 for regulating the drying operation. A control knob 18 selectively sets the control device 16 for various drying cycles of operation, as, for example, automatic or timed drying cycles. The enclosure cabinet 12 comprises a horizontal top panel 20 and a horizontal bottom panel 22, a pair of vertical side panels 24, a vertical front panel 26 and a vertical rear panel 28. An access opening 30 is provided in the front panel 26, as defined by an axially in-turned flange 31, having a closure door 32 cooperating therewith for loading and unloading the dryer 10.

The dryer 10 further includes a drying container for tumbling clothes, in the form of a revolving drum 34 housed within the cabinet 12 and extending axially from the front panel 26 to a bulkhead 36 spaced forwardly of the rear panel 28. To encourage tumbling action in the clothing being dried, a plurality of circumferentially spaced baffles 78 (only one being illustrated) are mounted on the inner surface of the drum 34. The drum 34 includes a radially inwardly extending front closure wall 41 having an access opening 42 therein formed by means of an axially out-turned flange 43. The flange 43 provides a forwardly extending bearing annulus which overlies and is suitably journaled on the complemental flange 31 of the cabinet 12. It will be apparent from the foregoing that the opening 42 into the drum 34 and the opening 30 formed in the front panel 26 are concentric and provide access into the rotatable drum 34 from outside the cabinet 12. The drum 34 is supported at the rear by a pair of support rollers 48 (only one being illustrated) mounted on the bulkhead 36. A raceway or circumferential groove 50 indented into the peripheral wall of the rear portion of the drum 34 serves as a track for the rollers 48.

A motor 52, mounted to the bottom panel 22 in a rear corner of the cabinet 12, rotatably drives the drum 34 by means of a drive belt 54 extending around the periphery of and in frictional engagement with the drum 34 and around a motor pulley 56 which is mounted at one end of a motor shaft 58. The other end of the motor shaft 58 drives a blower 60, arranged to circulate air through the drum 34. The blower 60 is included in a warm air system 62 positioned between the rear panel 28 and the bulkhead 36.

The bulkhead 36 serves to enclose the open-ended rear portion of the drum 34 and provides a fixed rear wall in which to locate a pair of spaced openings comprising an air inlet 64 and an air outlet 66. The blower 60 draws moisture-laden air from the interior of the drum 34 through the outlet 66, through a removable lint screen 68 and an air duct 70 to the blower 60, and out of the cabinet 12 through an exhaust duct 72. Air exhausted from the drum 34 is replaced by ambient air entering the warm air system 62 by way of an intake opening in the rear panel 28 (not shown) and is drawn through a fresh air duct 74 passing over a heater means 76 and into the drum 34 through the inlet 64. The warm air system 62 thus circulates a stream of warm air through the drum 34, subjecting clothing placed therein to a drying environment to remove moisture from the fabrics while the clothing is tumbled as the drum rotates.

Figure 2:
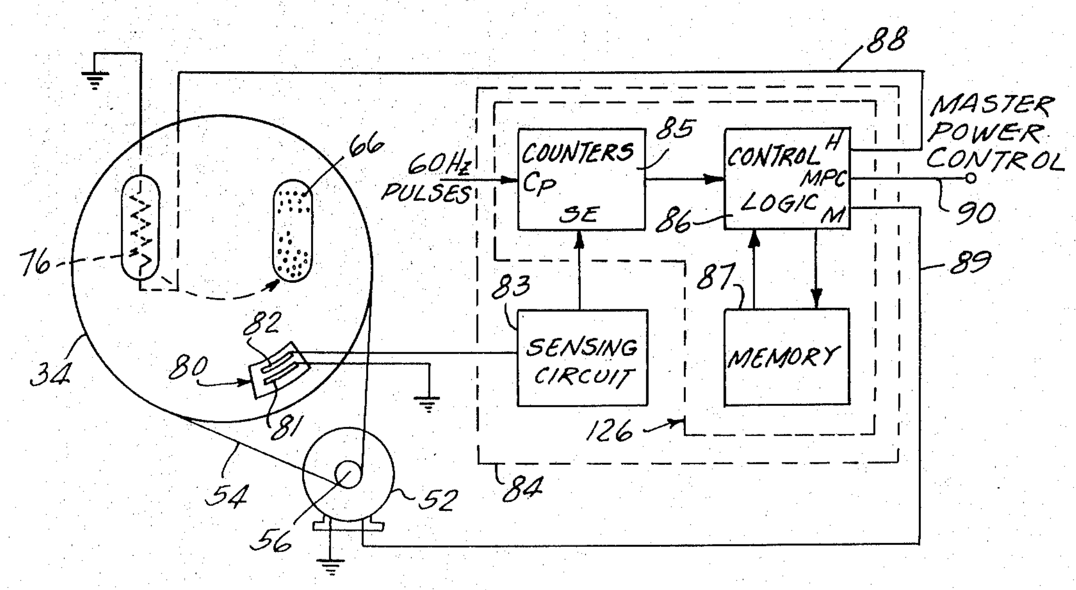
FIG. 2 is a schematic diagram of an integrated circuit controlled dryer as may apply to the apparatus of FIG. 1.

Referring to FIG. 2, the drum 34 is schematically illustrated as being driven by the motor 52 via the belt 54 and the motor pulley 56. The warm air system is also schematically illustrated by the heater means 76, the broken arcuate arrow indicating air flow and the outlet 66.

The drum also includes a moisture sensor 80 which comprises a pair of electrodes 81 and 82 which are bridged by the moist tumbling fabric as the clothing is being dried. The sensor electrode 81 is connected to ground and the sensor electrode 82 is connected to a moisture sensing circuit 83 of an integrated circuit control 84, such as described in the aforementioned U.S. Pat. No. 3,702,030. The moisture sensing circuit 83 operates to provide repetitive pulses to a counter circuit 85 of an integrated circuit 126. As the moisture content decreases the frequency of output pulses of the sensing circuit 83 increases. As set forth in the aforementioned U.S. Pat. No. 3,702,030, the counter circuit 85 comprises two separate counting chains which are toggled by clock pulses at 60 Hz derived from conventional line current. A first of these counters is repetitively reset by the output pulses of the sensing circuit 83 and is in turn employed to provide reset pulses for the second counter before the second counter reaches a predetermined count. Therefore, as the frequency of output pulses from the sensing circuit 83 increases so that the first counter is repetitively reset at a rate faster than it takes for it to reset the second counter, the second counter is allowed to reach the predetermined count, indicating that the fabric has reached a predetermined moisture content. Above the predetermined count, the second counter operates to provide control signals to a control logic circuit 86 which, in conjunction with a drying program stored in a memory 87, provides output control signals for the dryer as schematically represented in FIG. 2. The most apparent of these control signals include control of heater energization by way of the control lead 88, control of drive motor energization by way of a control lead 89, and the control of application of power to the entire dryer control by way of a control lead 90. The control knob 18 in FIG. 1, or push buttons or the like, operate switches which cooperate with the control logic 86 and the memory 87 to select or alter a drying program, and the control device 16 illustrated in FIG. 1 may be considered as including all of the integrated circuit controlling circuits, the clock pulse derivation circuit, etc.

Figure 3:
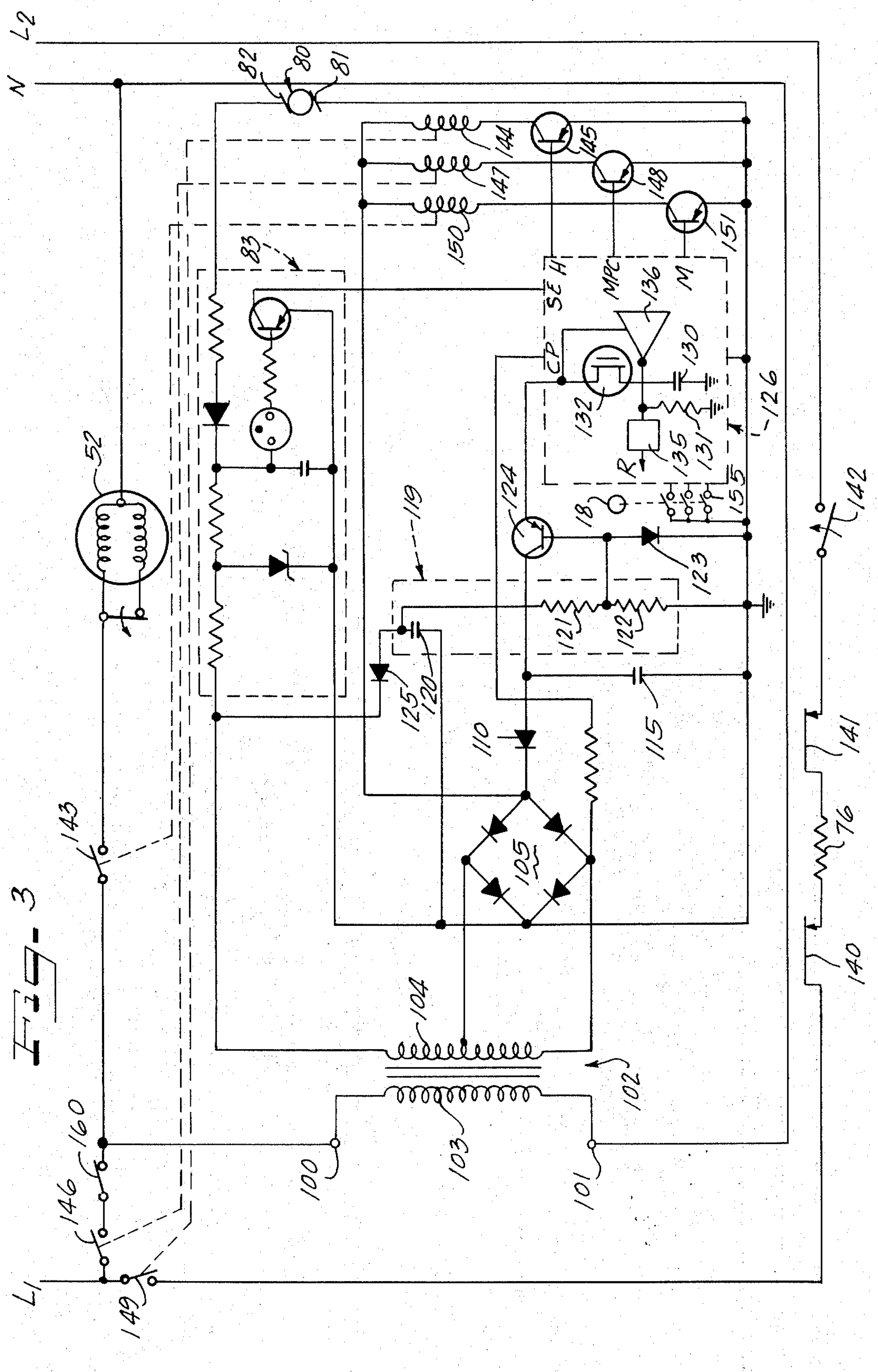
FIG. 3 is a schematic circuit diagram of an integrated circuit for controlling a dryer, the D.C. power supply for the integrated circuit and an embodiment of D.C. shutdown circuitry as it applies to the illustrated power supply and integrated circuit.

With the foregoing concept of dryer operation and integrated circuit control of such operation in mind, and turning to FIG. 3, a schematic circuit diagram for the dryer of FIG. 1 is shown. The dryer is connected to a power supply, for example a three-wire 230 volt commercial supply, at terminals L1, L2, and N. With such a commercial supply, a 230 volt potential is provided across terminals L1–L2, and a 115 volt potential is provided across terminals L1–N. The circuit is divided such that one portion of its components is generally associated with 115 volt operation from terminals L1–N and another portion of its components is associated with 230 volt operation provided by way of terminals L1–L2.

More specifically, the portion of the circuit associated with terminals L1–L2 comprises the heater 76 serially connected with an operating thermostat 140, a safety thermostat 141, a switch 142 centrifugally operated by the motor 52 at a predetermined speed, and relay contacts 149 controlled by a coil 150 such that the heater is energized by terminals L1–L2 when contacts 140 are closed and the motor reaches the predetermined speed to close switch 142.

The circuit associated with L1–N comprises a motor 52 serially connected with motor relay contacts 143, normally closed door switch 160, and master power control relay contacts 146 across L1–N. Further, a transformer 102 is connected across terminals L1–N as will be more fully explained. Associated with and receiving power from the power supply are the sensor circuit 83, sensor 80, and integrated circuit 126. A detailed explanation of the sensor circuit may be had by reference to the aforementioned U.S. Pat. No. 3,702,030. The integrated circuit 126, provides output control signals M, MPC and H which control the conduction of respective transistors 151, 148, 145 causing energization of respective relay coils 150, 147, 144. The relay coils 150, 147, 144 respectively control closure of contacts 143, 146, 149, whereby output signals M, MPC, and H respectively control energization of the motor 52, the master power control contacts 146, and the heater 76.

In operation, manual closure of contacts 146 through a push to start button 17 on the console 14 energizes the integrated circuit to provide output signals M, MPC and H to cause energization of the motor, heater and the master power control relay contacts 146 for operation of the dryer through a drying program under the control of the integrated circuit 126 determined by a selector switch 155 in association with control knob 18.

The energization of the integrated circuit 126 is controlled by circuitry associated with the power supply 102 as is hereinafter explained. The integrated circuit 126 is shown connected through a D.C. power supply and a D.C. shut-down circuit to the transformer 102. In the integrated circuit 126, a reset pulse, referenced by the output R, is generated to reset the memory 87 of FIG. 2 to an initial state, for example to zero. If for any reason power is removed from the integrated circuit 126 and the reset pulse R is not produced, the memory 87 may assume a random state. In developing the reset pulse R in a circuit 135, which may be a gate circuit, a capacitor 130 is utilized to provide a delay in the pulse generation. When power is removed from the chip, the capacitor 130 must be completely discharged in order that the circuit 135 and the amplifier 136 (FIG. 3) can cooperate again to produce the reset pulse R. A transistor 132 is utilized to bleed off charge on the capacitor 130 when power is removed from the chip. However, the transistor 132 ceases to conduct at approximately 4.5 volts and, therefore, a resistor 131 is connected in parallel with the capacitor 130 to bleed the remaining charge from the capacitor. In order for the pulse R to be generated after an interruption of power to the integrated circuit 126, as by the opening or closing of the dryer door, or by the termination and then restarting of the dryer, the voltage must be quickly removed from the integrated circuit chip in order that the time required to bleed the capacitor to zero will be available before the machine can be restarted. The circuit illustrated in FIG. 3 for performing this function comprises the power transformer 102 having a primary winding 103 which is connectible to the 110 volt supply at the terminals 100, 101 and a secondary winding 104, a full wave bridge rectifier 105, a filter capacitor 115, an emitter-follower voltage regulator including a transistor 124 and a Zener diode 123, and the D.C. shutdown circuit indicated at 119 including a resistor 121, a resistor 122 and a capacitor 120.

The A.C. voltage applied to the primary winding 103 of the transformer 102 from terminals L1–N is transformed to approximately 30 volts, rectified by the full wave bridge rectifier 105 and filtered by the capacitor 115. Simultaneously, aproximately 110 volts becomes available at the upper terminal of the secondary winding 104, is half wave rectified by a diode 125 and is then fed to the capacitor 120 as a half wave charging current. The charge on the capacitor 120 is then coupled to the base of the regulator transistor 124 through the voltage divider network including the resistor 121 and the resistor 122. When at least 90 volts is applied to the primary winding 103 of the transformer 102, sufficient current is delivered to the base of the transistor 124 to turn on the transistor and maintain the Zener reference diode 123 in conduction. This provides a regulated source of smooth D.C. from the capacitor 115 to the integrated circuit 126. The values of the resistors 121 and 122 and the capacitor 120 are selected so that the RC time constant of the circuit supplying base current to the transistor 124 is very short. As a result, when an interruption in the A.C. supply voltage occurs, the charge on the capacitor 120 is quickly exhausted and the current provided to the base of the transistor 124 is insufficient to maintain the transistor in conduction. The voltage on the base of the transistor falls to zero quickly, the transistor turns off and the D.C. current from the capacitor 115 is isolated from the integrated circuit 126.

Removal of the D.C. voltage from the integrated circuit 126 permits the internal pulse generating network to reset for the next time the D.C. voltage is applied to the control. The value of the capacitor 115 is very large, for example 150 microfarads, in comparison to the capacitor 120 which may be, for example, 0.33 microfarads, and there is no bleed resistor connected across the capacitor 115. Consequently, when the regulating transistor 124 is turned off, charge can be stored on the capacitor 115 for very long periods of time. This guarantees the availability of a smooth D.C. voltage for application to the intergrated circuit 126 during periods when the control might be subjected to a rapid succession of restarts.

From the foregoing it is apparent that the objects of the invention have been completely fulfilled in that a D.C. shutdown circuit has been provided which is simple and easy to construct utilizing a minimum of additional components to the control circuit; the D.C. shutdown circuit provides assurance that the memory will be initialized whenever there is an interruption of power; and the filter capacitor for the D.C. supply is isolated from the circuit when the power is removed so that even upon the occurrence of a rapid succession of restarts there is always a smooth well filtered D.C. voltage available to the integrated circuit upon a restart.

Although I have described my invention by reference to a particular illustrative embodiment thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

The embodiments of the invention in which an exclusive property or privilege is claimed are defined as follows:

1. A dryer including a control comprising an integrated circuit having a memory storing a drying program and an internal pulse generating means for generating a pulse to initialize the memory, and a D.C. supply for the control, said D.C. supply comprising:

a power transformer for connection to an A.C. power source;

a first rectifier connected to said transformer and having first and second leads and operable to supply a D.C. voltage to said integrated circuit by way of said first and second leads;

a first capacitor connected across said first and second leads to filter the supply of D.C. voltage;

voltage regulator means including a transistor connected in circuit with said first and second leads and operable to remove the D.C. supply voltage from said integrated circuit and isolate said first capacitor; and a second rectifier connected to said transformer for supplying a supplemental rectified D.C. voltage;

D.C. shutdown means connected to said second rectifier and to said voltage regulator means including a second capacitor connected to and charged by said second rectifier, and resistance means connecting said second capacitor to said voltage regulator means, said D.C. shutdown means operable within a predetermined interval in response to disconnection of the A.C. power source from said power transformer to cause said voltage regulator means to remove the D.C. voltage from said integrated circuit, said predetermined interval being sufficient to permit said internal pulse generating means to generate a pulse when the A.C. power source is reconnected.

2. A dryer according to claim 1, wherein said supplemental supply means comprises a diode.

3. A dryer according to claim 1, wherein said voltage regulator means comprises a Zener diode connected between said transistor and one of said leads, and said resistance means comprises at least two serially connected resistors connected across said second capacitor and connected to the junction between said transistor and said Zener diode.

4. A dryer including a control comprising an integrated circuit having a memory storing a drying program and an internal pulse generating means for generating a pulse to initialize the memory, and a D.C. supply for said control, said D.C. supply comprising:

first rectifier means for connection to an A.C. supply for deriving full wave rectified D.C. voltage;

filter means connected to said first rectifier means for smoothing the full wave rectified D.C. voltage;

second rectifier means for connection to the A.C. supply for deriving a half wave rectified voltage;

a voltage regulator operable to connect and disconnect said filter means and said integrated circuit; and D.C. shutdown means connected in circuit between said second recitifier means and said voltage regulator and including connection control means effective in response to connection of said second rectifier means to the A.C. supply to cause said voltage regulator to connect said integrated circuit to said filter means; and disconnection control means effective via said connection control means in response to disconnection of said second rectifier means from the A.C. supply to cause said voltage regulator to disconnect said integrated circuit from said filter means.

5. A dryer according to claim 4, wherein said voltage regulator comprises a transistor having a collector-emitter path connected between said filter means and said integrated circuit and a base, and a breakdown diode connected between said base and a reference potential;

said connection control means comprises a voltage divider connected between said second rectifier means and said reference potential and including a tap connected to said base for supplying base current sufficient to sustain conduction of said transistor; and said disconnection control means comprises a capacitor connected across said voltage divider charged in response to the half wave rectified voltage and rapidly discharged via said voltage divider upon the loss of such voltage to rapidly remove the base current from said transistor.

6. A dryer according to claim 4, wherein said voltage regulator comprises a transistor having a control electrode and said connection control means comprises a voltage divider connected between said second rectifier means and said control electrode of said transistor to supply operating current to said transistor.

7. A dryer according to claim 4, wherein said voltage regulator comprises a transistor having a control electrode and said disconnection control means comprises a capacitor connected to and charged via said second rectifier means and connected to said control electrode of said transistor so that the discharging of said capacitor in response to an interruption in the A.C. supply rapidly exhausts the control current of said transistor and renders said transistor nonconductive.

8. In a clothes dryer circuit including an integrated circuit energized from a D.C. source the integrated circuit having a memory for storing a drying cycle program, means for ensuring application of smooth well filtered D.C. voltage to the integrated circuit during drying cycle operation together with rapid removal of the D.C. voltage from the integrated circuit on interruption of the power supply to the D.C. source to enable positive reset of the memory to a desired initial condition, comprising a transistor having its emitter connected to the integrated circuit, a filtered D.C. power supply network for the integrated circuit including a first capacitor connected to the collector of the transistor, a resistor-capacitor network including a second capacitor and having a relatively small RC time constant connected to the base of the transistor, the capacitance of said first capacitor being very large relative to the capacitance of said second capacitor whereby on interruption of a drying cycle program a charge may be stored on said first capacitor for a relatively long period of time to ensure availability of smooth D.C. for start-up of the integrated circuit, and the applied D.C. voltage is quickly removed from the integrated circuit due to the small RC time constant of the resistor-capacitor network.

9. In a clothes dryer circuit according to claim 8, wherein there is a voltage regulator means connected between the base of the transistor and ground.

* * * * *